(12) United States Patent
Forsyth et al.

(10) Patent No.: US 6,942,055 B2
(45) Date of Patent: Sep. 13, 2005

(54) ELECTRONICALLY-CONTROLLED REAR MODULE FOR ALL-WHEEL DRIVE SYSTEM

(75) Inventors: John R. Forsyth, Romeo, MI (US); Fred C. Porter, Beverly Hills, MI (US)

(73) Assignee: Magna Drivetrain of America, Inc., Troy, MI (US)

( * ) Notice: Subject to any disclaimer, the term of this patent is extended or adjusted under 35 U.S.C. 154(b) by 73 days.

(21) Appl. No.: 10/700,257

(22) Filed: Nov. 3, 2003

(65) Prior Publication Data

US 2004/0129475 A1 Jul. 8, 2004

Related U.S. Application Data

(63) Continuation-in-part of application No. 10/441,991, filed on May 20, 2003, now Pat. No. 6,672,420, which is a continuation of application No. 10/022,495, filed on Dec. 17, 2001, now Pat. No. 6,578,654.
(60) Provisional application No. 60/281,888, filed on Apr. 5, 2001.

(51) Int. Cl.$^7$ ............................................. B60K 17/344
(52) U.S. Cl. ...................... 180/249; 192/48.1; 475/86
(58) Field of Search ............................ 180/233, 248, 180/249, 250; 192/48.1; 475/84, 86, 87, 88; 701/82, 88, 89

(56) References Cited

U.S. PATENT DOCUMENTS

| | | | |
|---|---|---|---|
| 4,650,028 A | 3/1987 | Eastman et al. | |
| 5,699,888 A | 12/1997 | Showalter | |
| 5,964,126 A | 10/1999 | Okcuoglu | |
| 5,967,285 A | 10/1999 | Mohan et al. | |
| 6,095,939 A | * 8/2000 | Burns et al. | .................. 475/88 |
| 6,155,947 A | 12/2000 | Lowell | |
| 6,186,258 B1 | 2/2001 | Deutschel et al. | |
| 6,378,677 B1 | 4/2002 | Kuroda et al. | |
| 6,520,880 B1 | * 2/2003 | Fukushima et al. | ........... 475/84 |
| 6,578,692 B2 | 6/2003 | Porter | |
| 6,637,572 B2 | 10/2003 | Tomari et al. | |
| 6,725,989 B1 | 4/2004 | Krisher et al. | |

* cited by examiner

Primary Examiner—Kevin Hurley
(74) Attorney, Agent, or Firm—Harness, Dickey & Pierce P.L.C.

(57) ABSTRACT

A drive axle assembly for an all-wheel drive vehicle includes an adaptively controlled first hydraulic coupling for providing front-to-rear torque transfer control to a first wheel and an adaptively controlled second hydraulic coupling for providing front-to-rear torque control to a second wheel. The drive axle assembly is contained with a common housing and communicates with a traction control system to actively control actuation of the first and second hydraulic couplings based on the operating characteristics of the vehicle as detected by suitable sensors.

10 Claims, 12 Drawing Sheets

ELECTRONICALLY-CONTROLLED REAR
MODULE FOR ALL-WHEEL DRIVE SYSTEM

CROSS-REFERENCE TO RELATED APPLICATIONS

This application is a continuation-in-part of U.S. Ser. No. 10/441,991 filed May 20, 2003 now U.S. Pat. No. 6,672,420 which is a continuation of U.S. Ser. No. 10/022,495 filed Dec. 17, 2001, now U.S. Pat. No. 6,578,654, and which claims the benefit of U.S. Provisional Ser. No. 60/281,888 filed Apr. 5, 2001.

FIELD OF THE INVENTION

The present invention relates generally to hydraulic couplings for use in motor vehicle driveline applications to limit slip and transfer torque between rotary members. More specifically, a drive axle assembly for an all-wheel drive vehicle is disclosed having a pair of hydraulically-actuated multi-plate clutch assemblies and an electronically-controlled fluid distribution system operable to control actuation of both clutch assemblies.

BACKGROUND OF THE INVENTION

In all-wheel drive vehicles, it is common to have a secondary drive axle that automatically receives drive torque from the drivetrain in response to lost traction at the primary drive axle. In such secondary drive axles, it is known to provide a pair of clutch assemblies connecting each axleshaft to a prop shaft that is driven by the drivetrain. For example, U.S. Pat. No. 4,650,028 discloses a secondary drive axle equipped with a pair of viscous couplings. In addition, U.S. Pat. Nos. 5,964,126, 6,095,939, 6,155,947 and 6,186,258 each disclose secondary drive axles equipped with a pair of pump-actuated multi-plate clutch assemblies. In contrast to these passively-controlled secondary drive axles, U.S. Pat. No. 5,699,888 teaches of a secondary drive axle having a pair of multi-plate clutches that are actuated by electromagnetic actuators that are controlled by an electronic control system.

In response to increased consumer demand for motor vehicles with traction control systems, hydraulic couplings are currently being used in a variety of driveline applications. Such hydraulic couplings rely on hydromechanics and pressure-sensitive valve elements to passively respond to a limited range of vehicle operating conditions. These hydraulic couplings are susceptible to improvements that enhance their performance, such as a more controlled response to a wider range of vehicle operating conditions. With this in mind, a need exists to develop improved hydraulic couplings that advance the art.

SUMMARY OF THE INVENTION

It is an objective of the present invention to provide a drive axle assembly for use in the drivetrain of an all-wheel drive vehicle that advance the state of the art.

Another objective of the present invention is to provide a drive axle assembly having an input member driven by the powertrain, first and second axleshafts driving a corresponding pair of wheels, a first clutch for controlling torque transfer from the input member to the first axleshaft, a second clutch for controlling torque transfer from the input member to the second axleshaft, and a control system for controlling independent actuation of the first and second clutches.

As a related objective, the control system is operable to establish a two-wheel drive mode wherein no drive torque is transferred to either of the axleshafts, an on-demand drive mode wherein drive torque is delivered to at least one of the axleshafts, and a full-time drive mode wherein drive torque is distributed to each axleshaft as required to limit excessive wheel slip and control the torque distribution ratio between the axleshafts.

In carrying out the above objectives, the drive axle assembly of the present invention includes a pinion shaft driven by the powertrain, a drive case driven by the pinion shaft, a first clutch assembly operably disposed between the drive case and the first axleshaft, a second clutch assembly operably disposed between the drive case and the second axleshaft, a pump driven by the pinion shaft, and a fluid control system for supplying fluid from the pump to actuator assemblies associated with each of the clutch assemblies.

The actuator assembly for each clutch assembly includes a piston mounted in a piston chamber for movement relative to a multi-plate clutch pack. The fluid control system regulates the fluid pressure supplied to each piston chamber to control the clutch engagement force exerted by the pistons on the clutch packs. The fluid control system includes a pair of electrically-controlled control valves operable for regulating the fluid pressure delivered to each piston chamber. Preferably, the control valves regulate the fluid pressure based on control signals generated by an electronic control module that monitors and responds to specific vehicle operating conditions.

BRIEF DESCRIPTION OF THE DRAWINGS

Further objects, features and advantages of the present invention will become readily apparent from the following detailed specification and the appended claims which, in conjunction with the drawings, set forth the best mode now contemplated for carrying out the invention. Referring to the drawings:

BRIEF DESCRIPTION OF THE DRAWINGS

Figure 1:
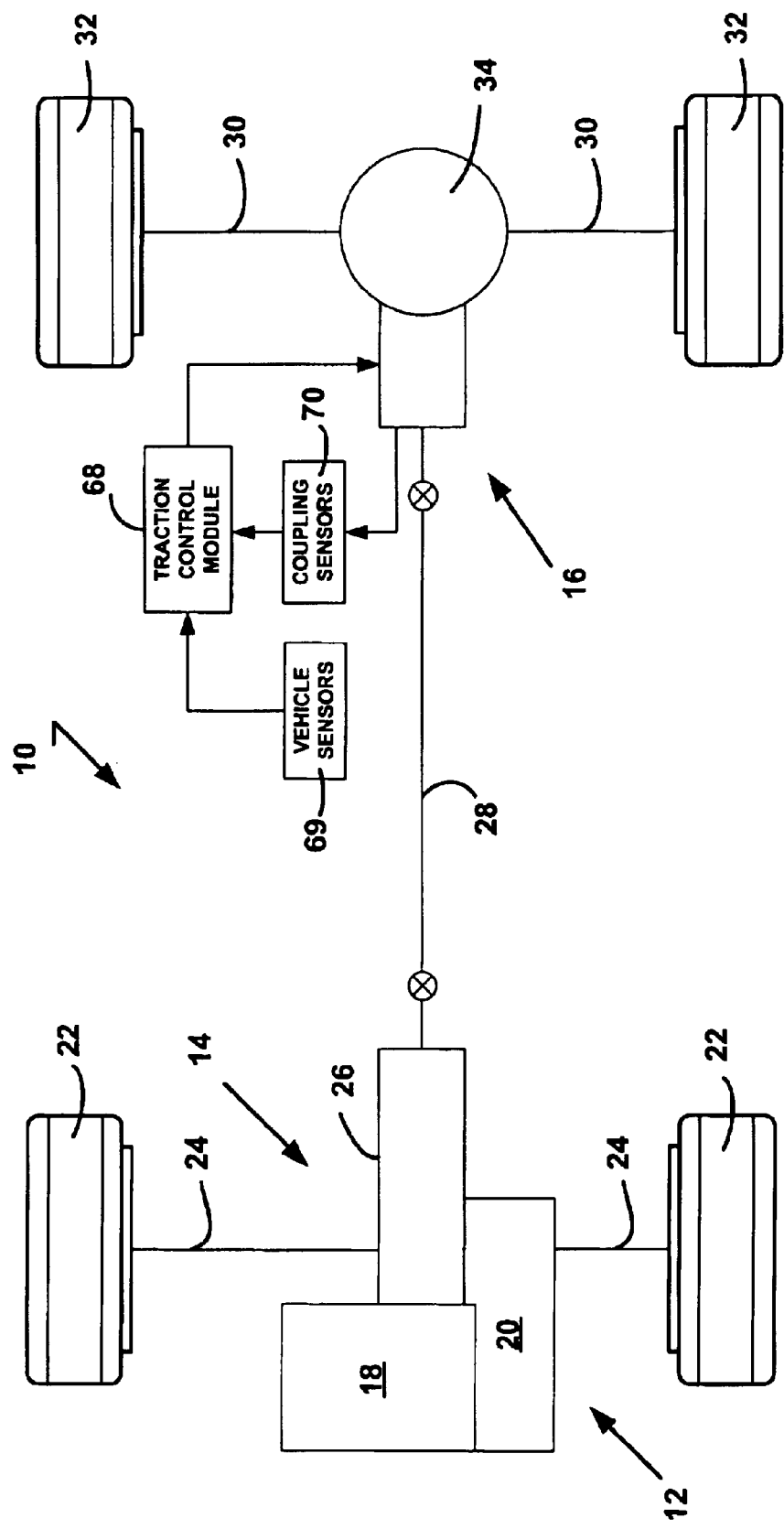
FIG. 1 is a schematic view of a motor vehicle drivetrain equipped with a drive axle assembly constructed in accordance with the present invention.
Figure 2:
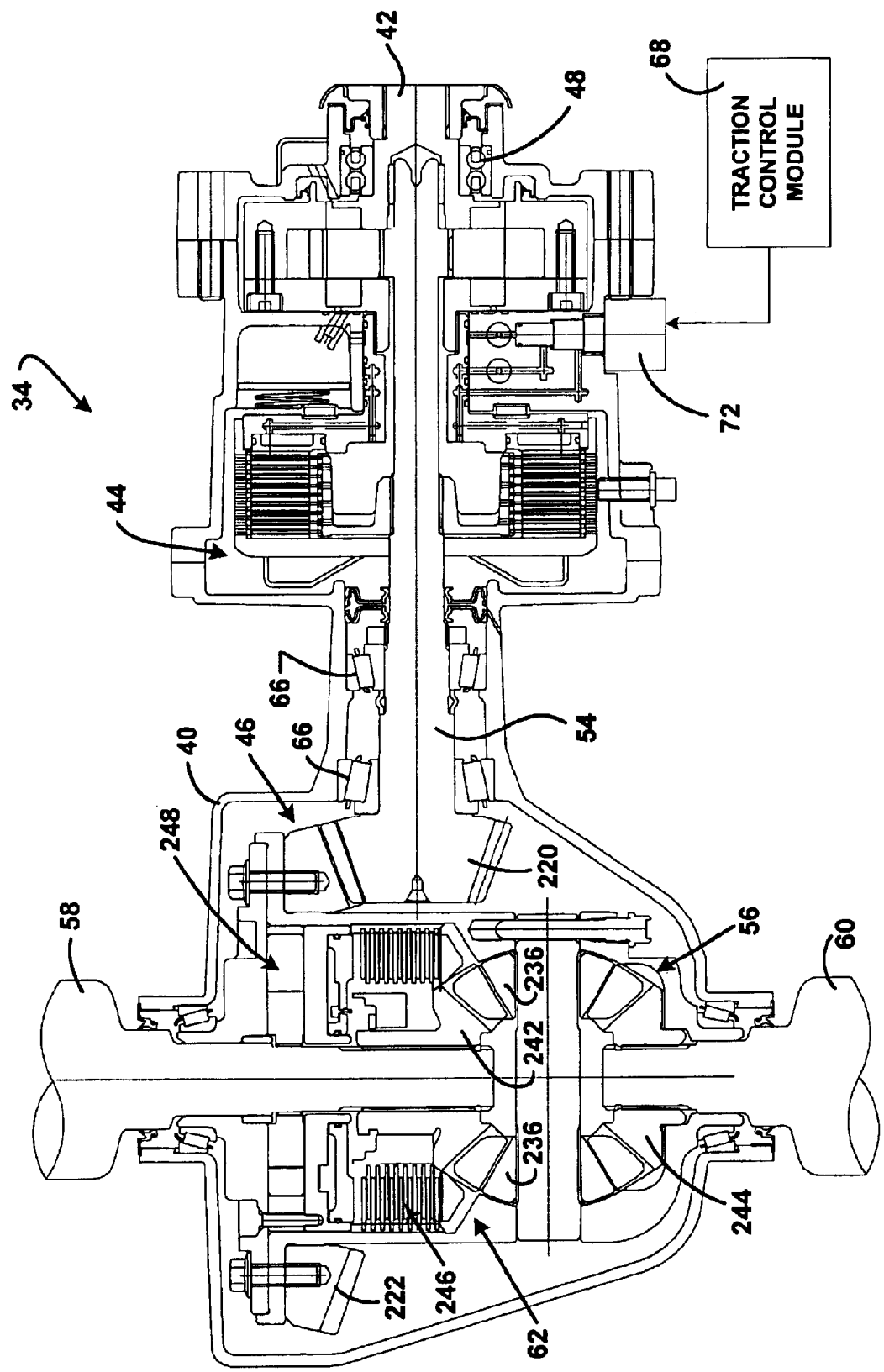
FIG. 2 is a sectional view of the drive axle assembly of the present invention.
Figure 3:
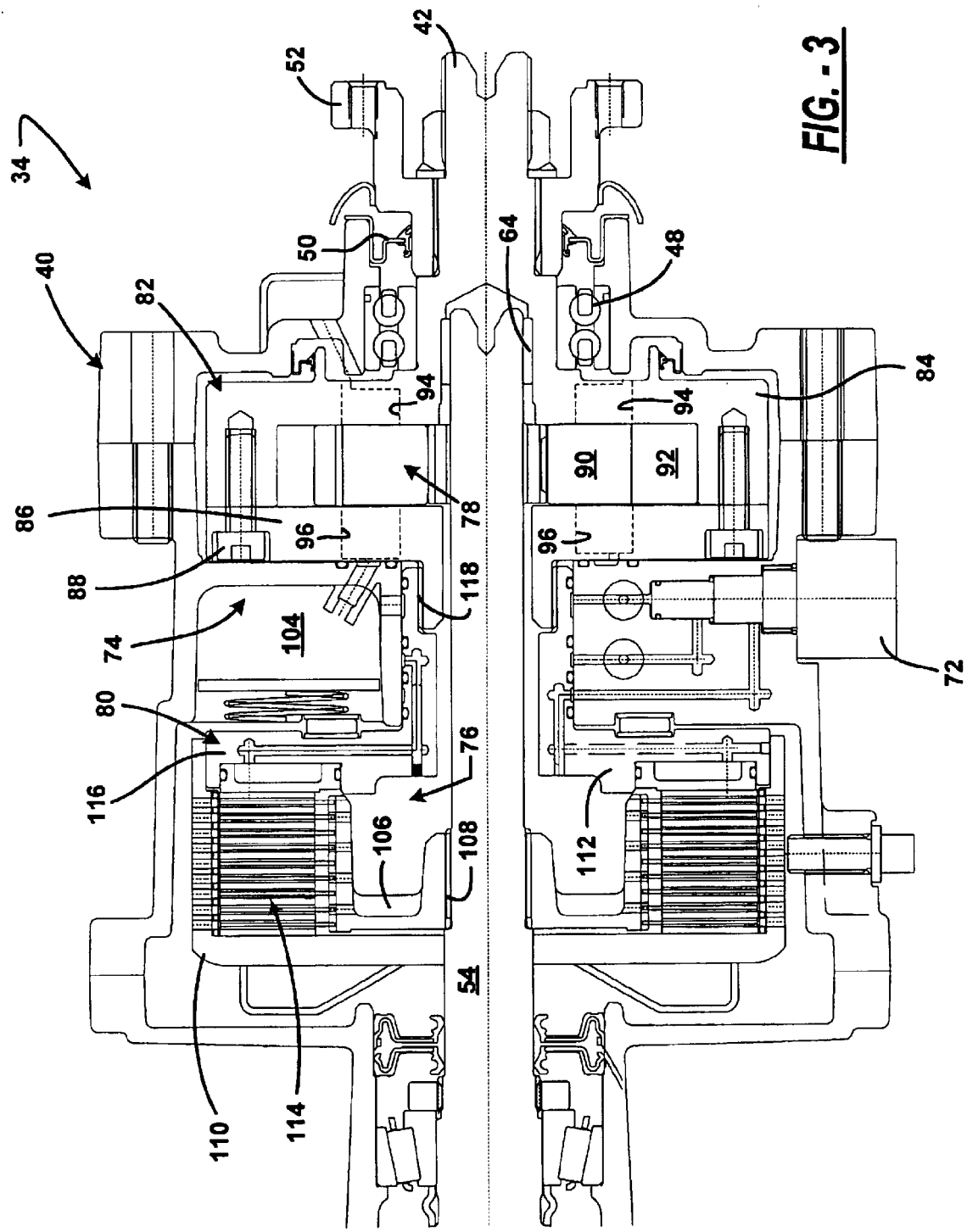
FIG. 3 is a sectional view of an on-demand hydraulic coupling associated with the drive axle assembly.
Figure 4:
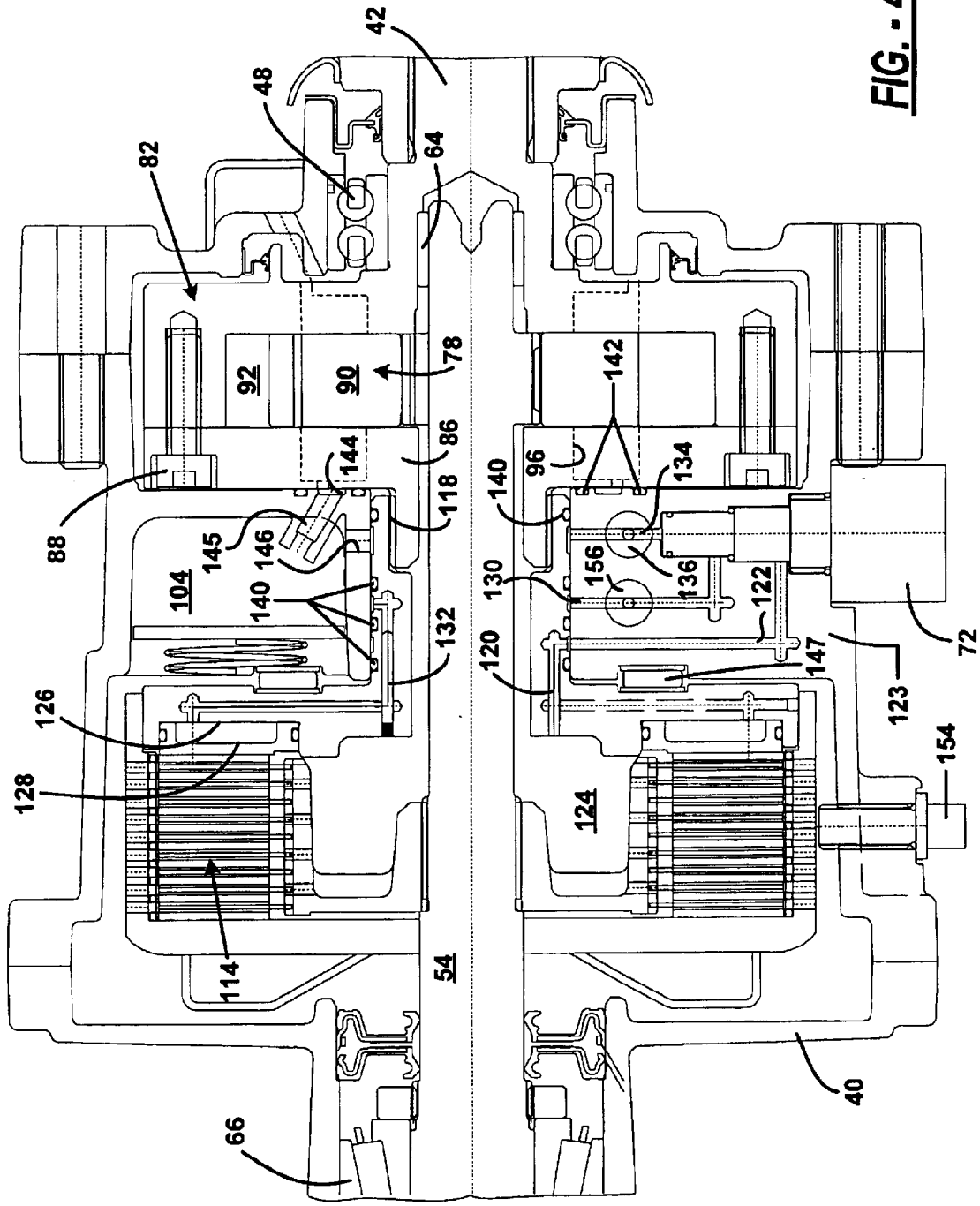
FIG. 4 is an enlarged partial view taken from FIG. 3 showing components of the hydraulic coupling in greater detail.

With reference to FIG. 1, a schematic layout for a vehicular drivetrain 10 is shown to include a powertrain 12 driving a first or primary driveline 14 and a second or secondary driveline 16. Powertrain 12 includes an engine 18 and a transaxle 20 arranged to provide motive power (i.e., drive torque) through a front differential (not shown) to a pair of wheels 22 associated with primary driveline 14. In particular, primary driveline 14 includes a pair of halfshafts 24 connecting wheels 22 to the front differential associated with transaxle 20. Secondary driveline 16 includes a power take-off unit (PTU) 26 driven by transaxle 20, a prop shaft 28 driven by PTU 26, a pair of axleshafts 30 connected to a pair of wheels 32, and a drive axle assembly 34 operable to transfer drive torque from propshaft 28 to one or both axleshafts 30.

Referring to FIGS. 2 through 7, the components associated with drive axle assembly 34 will be now detailed. Drive axle assembly 34 includes a multi-piece housing 40, an input shaft 42, a first hydraulic coupling 44, and a rear differential drive module 46. Input shaft 42 is rotatably supported in housing 40 by a bearing assembly 48 and sealed relative thereto via a seal assembly 50. A yoke 52 is secured to input shaft 42 and is adapted for connection to propshaft 28. Drive module 46 includes a pinion shaft 54, a bevel-type differential gearset 56, a pair of output shafts 58 and 60 adapted for connection to axleshafts 30, and a second hydraulic coupling 62. In operation, first hydraulic coupling 44 is operable to transfer drive torque from input shaft 42 to pinion shaft 54 in response to excessive interaxle speed differentiation between propshaft 28 and differential gearset 56. Second hydraulic coupling 62 is operable to limit intra-axle slip in response to excessive speed differentiation between output shafts 58 and 60.

Shafts 42 and 54 are rotatable relative to one another, with input shaft 42 being supported by a bearing assembly 64 for rotation relative to pinion shaft 54. Bearing assemblies 66 are also provided for supporting pinion shaft 54 for rotation relative to housing 40. As will become apparent, hydraulic coupling 44 is controlled by an electronic traction control module 68 for automatically controlling torque transfer and speed differentiation between shafts 42 and 54. Electronic traction control module 68 monitors vehicle system information (i.e., via vehicle sensors 69) and hydraulic coupling information (i.e., via coupling sensors 70). Coupling sensors 70 may include, but are not limited to, wheel speed, oil sump temperature, oil outlet temperature, and clutch pressure. Vehicle sensors 69 may include, but are not limited to, wheel speed sensors, brake status sensor, transmission gear sensor, vehicle speed sensor, etc. Control module 68 is operable to control a pulse-width modulated (PWM) flow control valve assembly 72 associated with hydraulic coupling 44.

In general, hydraulic coupling 44 comprises two portions: an actuator assembly 74, and a transfer clutch 76 for transferring drive torque from a faster rotating shaft to a slower rotating shaft in response to excessive speed differentiation therebetween. Transfer clutch 76 is a hydraulically-actuated multi-plate clutch assembly operably coupled between input shaft 42 and pinion shaft 54. Actuator assembly 74 includes a hydraulic pump 78 and a piston assembly 80. Hydraulic pump 78 is confined within a cover assembly 82 which includes a cylindrical outer drum 84 and a cover plate 86 secured via fasteners 88 thereto. Cover assembly 82 is fixed for rotation with input shaft 42 and, in the embodiment shown, outer drum 84 is integral with input shaft 42. Preferably, hydraulic pump 78 is a bidirectional gerotor pump having a first toothed pump member 90 fixed (i.e., splined) for rotation with pinion shaft 54, and a second toothed pump member 92 journalled in an eccentric chamber formed in outer drum 84. With such an arrangement, relative rotation between input shaft 42 and pinion shaft 54 results in a pumping action which draws fluid from one of a pair of inlet chambers 94 on the suction side of pump 78 to a corresponding outlet chamber 96 on the discharge side of pump 78. To facilitate pumping action in both directions of rotation, hydraulic pump 78 includes suitable one-way check valves similar to the arrangement shown in commonly-owned U.S. Pat. No. 6,041,903 which is incorporated by reference. Specifically, a pair of one-way check valves 98 are installed in the hydraulic circuit between a fluid sump 100 and inlet chambers 94 to maintain a supply of fluid therein when pump 78 is static. Likewise, a second pair of check valves 102 are located in the fluid circuit between outlet chambers 96 and an internal accumulator 104 to maintain pressure therein. Inlet chambers 94 are in fluid communication with fluid-filled sump 100 which is located within housing 40.

Transfer clutch 76 includes a clutch hub 106 fixed via a splined connection 108 to pinion shaft 54, an outer drum 110 coupled via a piston housing 112 to cover assembly 82, and a clutch pack 114 having a plurality of inner clutch plates fixed (i.e., splined) to clutch hub 106 that are interleaved with a plurality of outer clutch plates fixed (i.e., splined) to outer drum 110. Outer drum 110 is journalled for rotation relative to pinion shaft 54. In addition, outer drum 110 is rigidly connected (i.e., welded) to an end plate segment 116 of piston housing 112 which, in turn, is fixed via splined connection 118 to cover plate 86. A first exhaust passage 120 formed in housing 112 and communicates with a second exhaust passage 122 formed in a valve body section 123 of housing 40 for exhausting fluid through PWM flow control valve assembly 72 into a clutch chamber 124 to provide an adequate supply of lubricating fluid for cooling and lubricating clutch pack 114.

Piston assembly 80 includes a piston chamber 126 that is formed in plate segment 116 of piston housing 112, and an actuation member or piston 128 disposed in annular piston chamber 126. Piston 128 is supported for axial sliding movement within piston chamber 126 relative to interleaved multi-plate clutch pack 114 for selectively applying a compressive clutch engagement force thereon, thereby transferring drive torque from input shaft 42 to pinion shaft 54 or vise versa.

A first fluid supply passage 130 is formed in valve body section 123 of housing 40 between PWM flow control valve assembly 72 and piston housing 112. First supply passage 130 communicates with a second supply passage 132 formed in piston housing 112 which communicates with piston chamber 126. An inlet passage 134 is formed in housing 40 for providing fluid communication between outlet chamber 96 of pump 78 and the inlet to PWM flow control valve assembly 72. A pressure relief valve 136 is provided in inlet passage 134 for preventing the pressure delivered to control valve assembly 72 from exceeding a predetermined maximum level.

The amount of drive torque transferred is proportional to the magnitude of the clutch engagement force exerted by piston 128 on clutch pack 114 which, in turn, is a function of the fluid pressure within piston chamber 126. The magnitude of the control pressure ($P_C$) delivered to piston chamber 126 is determined by PWM flow control valve assembly 72 which has a moveable valve element, the position of which is controlled by an electric control signal generated by control module 68. For example, control valve assembly 72 may be a variable force solenoid of valve using a pulse width modulation control strategy. The remaining fluid is exhaust through passages 120 and 122 at an exhaust pressure ($P_E$) which is the difference between the pump pressure $P_G$ generated by gerotor pump 78 and the control pressure $P_C$. As is known, the control pressure $P_C$ can be varied with precise control due to the use of PWM valve 72.

As seen, ring seals 140 are provided for sealing piston housing 112 for rotation relative to valve body section 123 of housing 40. Moreover, ring seals 142 are provided between cover plate 86 and valve body section 123 of housing 40 to provide a fluid tight seal therebetween. An annular chamber 144 formed in housing 40 provides fluid communication between outlet chambers 96 and an internal accumulator via flow passage 145. A second flow passage 146 communicates with a circumferential chamber formed in piston housing 112 which communicates with inlet passage 134. A thrust bearing 147 is shown between housing 40 and plate segment 116 of piston housing 112.

It was previously noted that electronic control module 68 monitors vehicle system information and certain hydraulic coupling information including wheel speed, oil sump temperature, the oil outlet temperature, and clutch pressure. In particular, the wheel speeds are detected by four (4) wheel speed sensors 150A–105D which are disposed on, or in close proximity to, each of the vehicles' wheels. The oil sump temperature is measured by a first temperature sensor 152 which is disposed in oil sump 100. The oil outlet temperature is detected by a second temperature sensor 154 that is located in proximity to clutch pack 114 in clutch chamber 124. The clutch pressure is detected by a clutch pressure sensor 156 which may be disposed in piston chamber 126 or in supply passage 130.

The electronic control module 68 employs a main algorithm which determines the desired clutch pressure based upon the difference in front wheel and rear wheel speed ($\Delta_S$). The present invention functions to modulate the clutch apply pressure through the use of PWM solenoid valve 72 with the main algorithm control logic and closed loop control. The duty cycle of the PWM control valve 72 is controlled electronically to control the level of fluid pressure applied to piston 128. Lacking any difference in speed between shafts 42 and 54, pump 78 turns as a unit and creates no hydraulic flow. However, accumulator 104 maintains the pump pressure at inlet 134 of control valve 72.

Upon introduction of differential speeds, the pump elements begin relative motion and commence hydraulic flow. Pulsations in pressure due to gerotor lobes may need to be dampened with the accumulator or other suitable means. The PWM valve duty cycle is controlled electronically by electronic control module 68 based upon the logic of the main algorithm and inputs from wheel speed sensors 150A–150D (ABS), pressure transducer 156 and temperature sensors 152 and 154. A second pressure transducer 160 can be used to provide a pressure signal to controller 68 from inlet passage 134. The wheel speed sensors are used to control the duty cycle of the PWM valve 72 that, in turn, controls the pressure being fed to piston chamber 126. They also signal controller 68 that a non-standard tire size (mini-spare) is on the vehicle so that the system can be deactivated or the operating characteristics can be changed.

Figure 5:
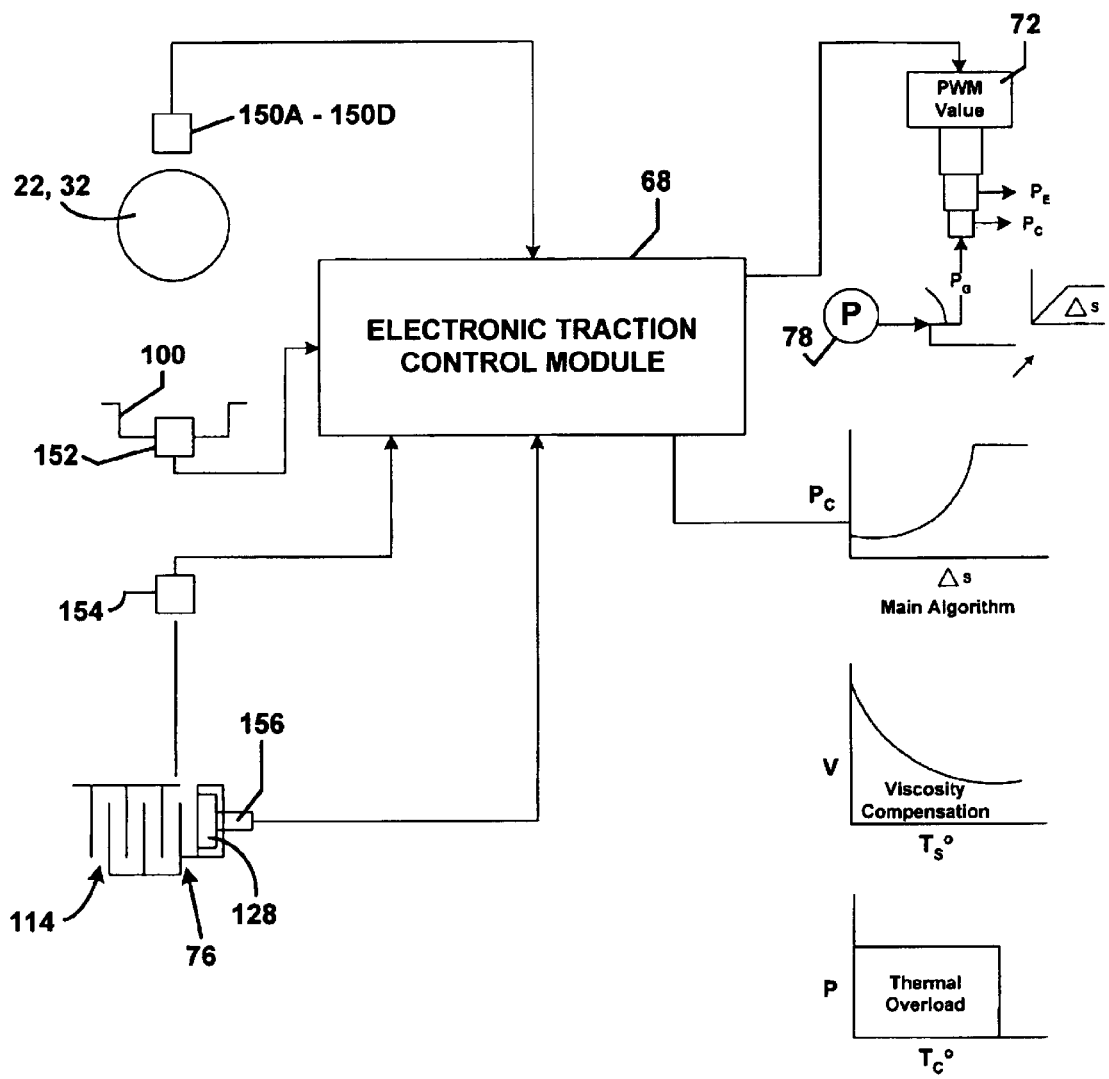
FIGS. 5 and 6 are schematic diagrams illustrating a hydraulic control circuit associated with the on-demand hydraulic coupling shown in FIG. 3.

Pressure transducer 156 signals controller 68 how much torque is being transferred so that the logic can control the torque according to predetermined requirements. It also can be used to limit the maximum torque transfer so that the system components can be down sized for mass and cost savings. Sump temperature sensor 152 is used to compensate for fluid viscosity changes on the inlet side of pump 78. An exemplary viscosity compensation chart is shown in FIG. 5 (labeled "viscosity compensation") with the fluid viscosity (V) decreasing as the sump fluid temperature ($T_S$) increases. The clutch outlet oil temperature sensor 154 is used to deactivate transfer clutch 76 during thermally abusive operation, thereby preventing clutch damage. An exemplary clutch deactivation curve is shown in FIG. 5 (labeled "thermal overload").

Figure 7:
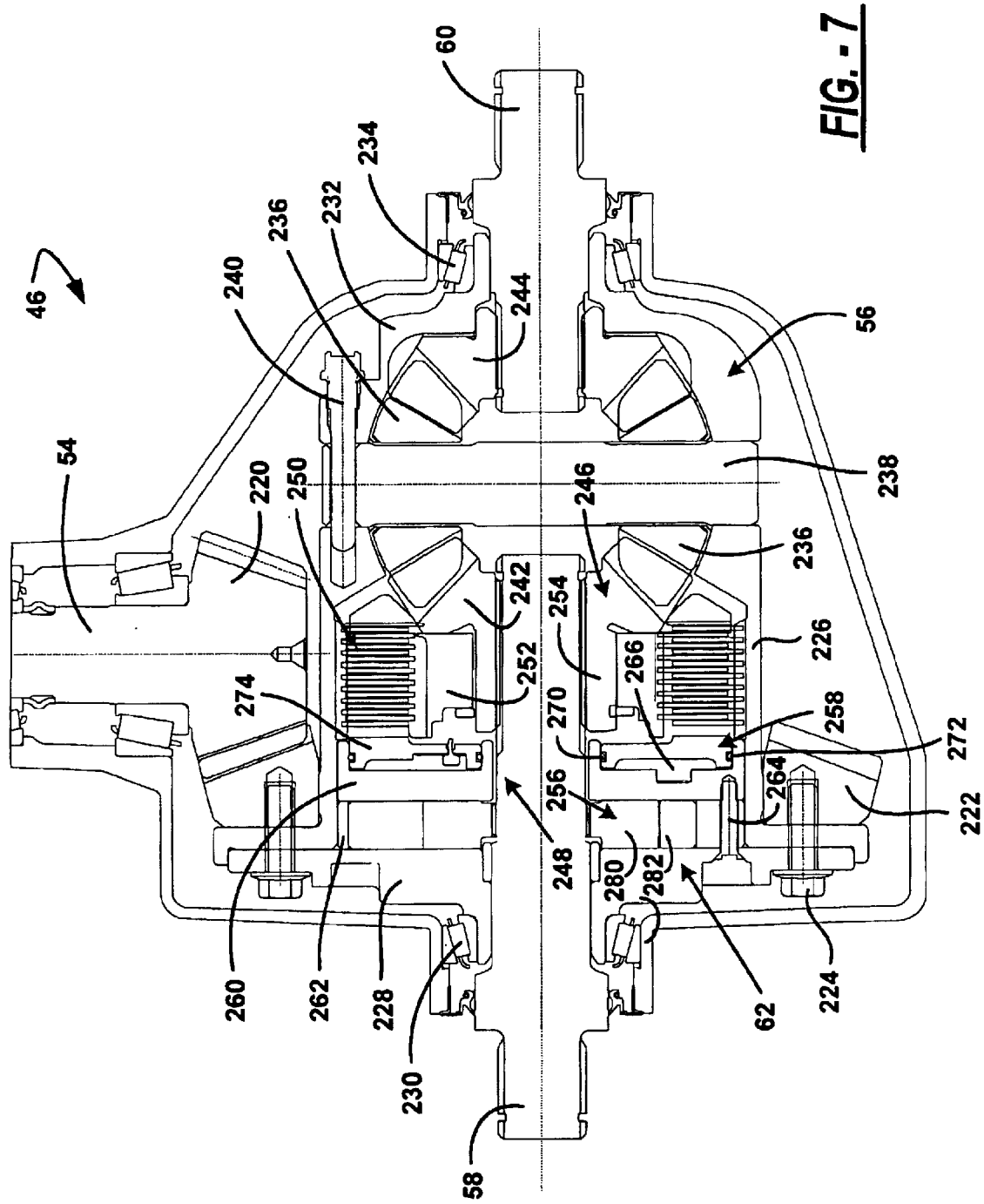
FIG. 7 is a sectional view of a differential drive module associated with the drive axle assembly of the present invention.

Referring primarily now to FIG. 7, the components of drive module 46 will be described. A drive pinion 220 is formed at the end of pinion shaft 54 and is meshed with a bevel ring gear 222 fixed via bolts 224 to a drive casing 226. An end cap 228 is also fixed via bolts 224 to drive casing 226 and is supported for rotation relative to housing 40 via a bearing assembly 230. A second end cap 232 is formed at the opposite end of drive casing 226 and is rotatably supported on housing 40 via a bearing assembly 234. Bevel gearset 56 includes a pair of pinion gears 236 rotatably supported on opposite ends of pinion shaft 238 that is non-rotatably fixed to drive casing 226 via a retainer screw 240. Gearset 56 further includes a first side gear 242 splined for rotation with first output shaft 58 and a second side gear 244 splined for rotation with second output shaft 60.

Second hydraulic clutch 62 includes a biasing clutch 246 and a clutch actuator 248. Biasing clutch 246 is a multi-plate clutch assembly having a clutch pack 250 of alternately interleaved inner and outer clutch plates that are respectively splined to a clutch hub 252 and drive casing 226. Hub 252 is splined to an axial hub section 254 of first side gear 242. Clutch actuator 248 includes a fluid pump 256 and a piston assembly 258. Pump 256 is a gerotor pump assembly disposed in a pump chamber formed between end cap 228 and a piston housing 260. An eccentric outer ring 262 of gerotor pump 256 and piston housing 260 are fixed for rotation with drive casing 226 via bolts 264. Piston assembly 258 is disposed in a piston chamber 266 formed in piston housing 260. Piston assembly 258 may be similar in function to that of piston assembly 96 such that a control valve (not shown) similar to control valve 116 can be used. Seal rings 270 and 272 seal a piston 274 of piston assembly relative to piston housing 260. If piston assembly 258 is similar to piston assembly 96, the hydraulic circuit shown in FIG. 5 would be applicable to illustrate the operation of second hydraulic coupling 62.

Pump 256 includes a pump ring 280 splined to first output shaft 68, and a stator ring 282 disposed between pump ring 280 and eccentric ring 262. The external lobes of pump ring 280 mesh with the internal lobes of stator ring 282, with stator ring 282 journalled in an eccentric aperture formed in eccentric rig 262. Relative rotation between drive casing 226 and first output shaft 58 generates a fluid pumping action. Check valves (not shown) are retained in inlet ports formed in end cap 228 while one-way check valves (not shown) are retained in flow passages formed in piston housing 260 between the outlet of pump 256 and piston chamber 266. These clutch valves function similarly to check valves 98 and 102 described in association with first hydraulic coupling 44. A pressure regulator valve is mounted in a by-pass passage through piston 274 to control pressurization of piston chamber 266 so as to allow a limited amount of unrestrained inter-wheel speed differentiation, such as during turns.

This arrangement of an in-line electronically-controlled hydraulic coupling 44 between prop shaft 78 and pinion shaft 54 permits adaptive "on-demand" transfer of drive torque to secondary driveline 16. Thus, all-wheel drive traction control is provided when needed in response to a loss of traction between the front and rear drivelines. Combining the automated in-line coupling with a passively-controlled second hydraulic coupling 62 in drive module 46 provides "front-to-back" and "side-to-side" traction control that is well suited for use in conjunction with a secondary driveline system. It is further contemplated that passive hydraulic coupling 62 could be replaced with an actively-controlled hydraulic coupling similar to hydraulic coupling 44 with traction control module 68 used to control speed differentiation and torque transfer between rear output shafts 58 and 60 based on control algorithms and logic.

Figure 8:
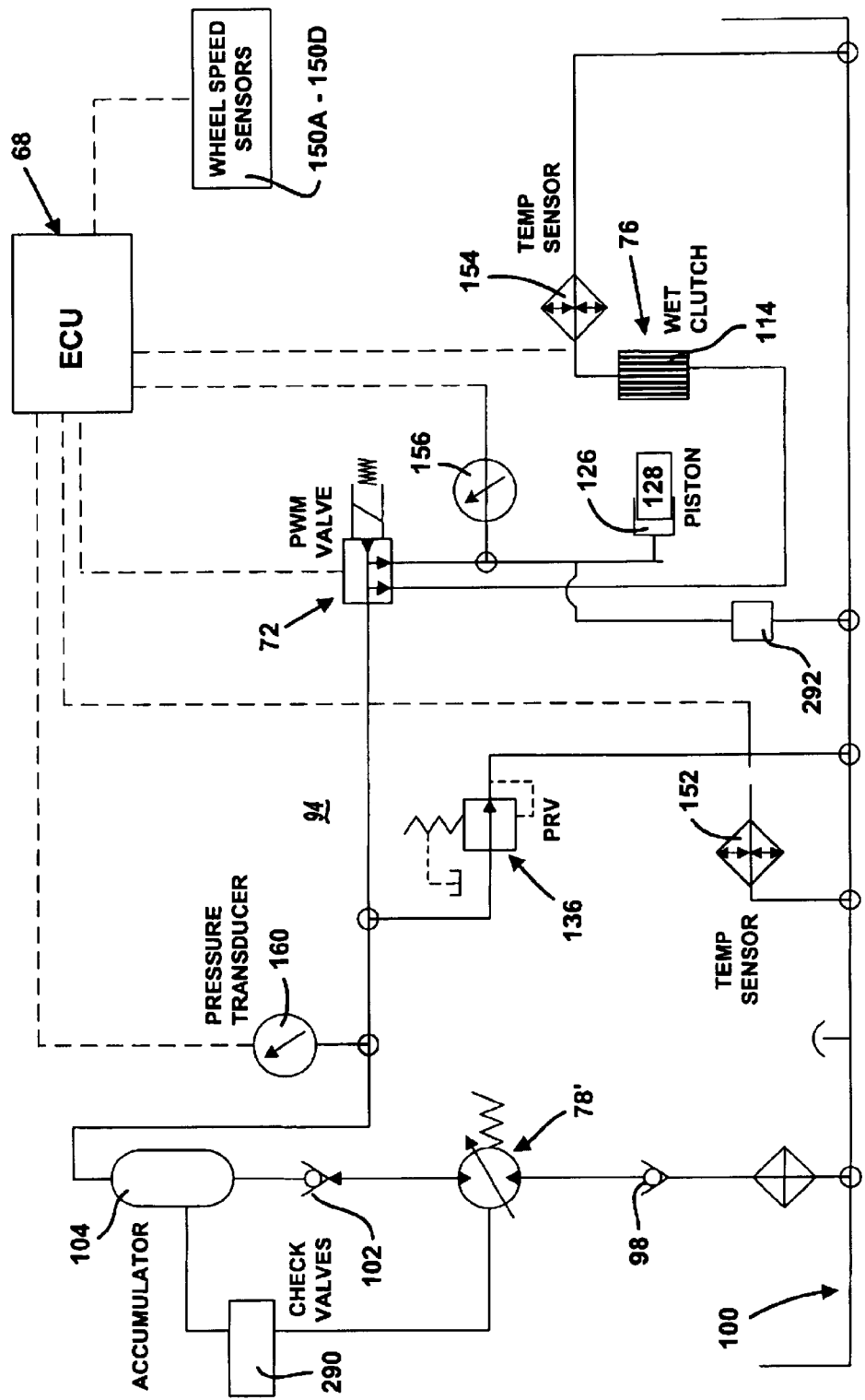
FIG. 8 is a schematic diagram illustrating a hydraulic circuit for an on-demand hydraulic coupling equipped with a variable displacement pump and a torque limiting feature.

The first embodiment of drive axle assembly 34 was equipped with a positive displacement pump assembly 78 mechanically driven by relative rotation between input shaft 42 and pinion shaft 54. In contrast, FIG. 8 illustrates a hydraulic circuit for hydraulic coupling 44 of drive axle assembly 34 which is now equipped with a bidirectional variable displacement pump 78' which can be driven either electrically or mechanically. To reduce system power requirements, variable displacement pump 78' can be of the vane-type used in many automatic transmissions that is driven at propshaft speed by input shaft 42. Accumulator 104 again is used to retain pressure at the inlet of control valve assembly 72 so as to assure immediate system activation upon demand. A pressure control or relief valve 290 is located in the hydraulic circuit between accumulator 104 and variable displacement pump 78' and a torque limiting valve 292 is located in the hydraulic circuit between piston chamber 126 and the control pressure outlet of control valve assembly 72. Torque limiting valve 292 is preferably an electrically-controlled solenoid valve receiving control signals from ECU 68. However, a mechanical pressure limiting valve is also contemplated for use with torque limiting valve 292.

Figure 9:
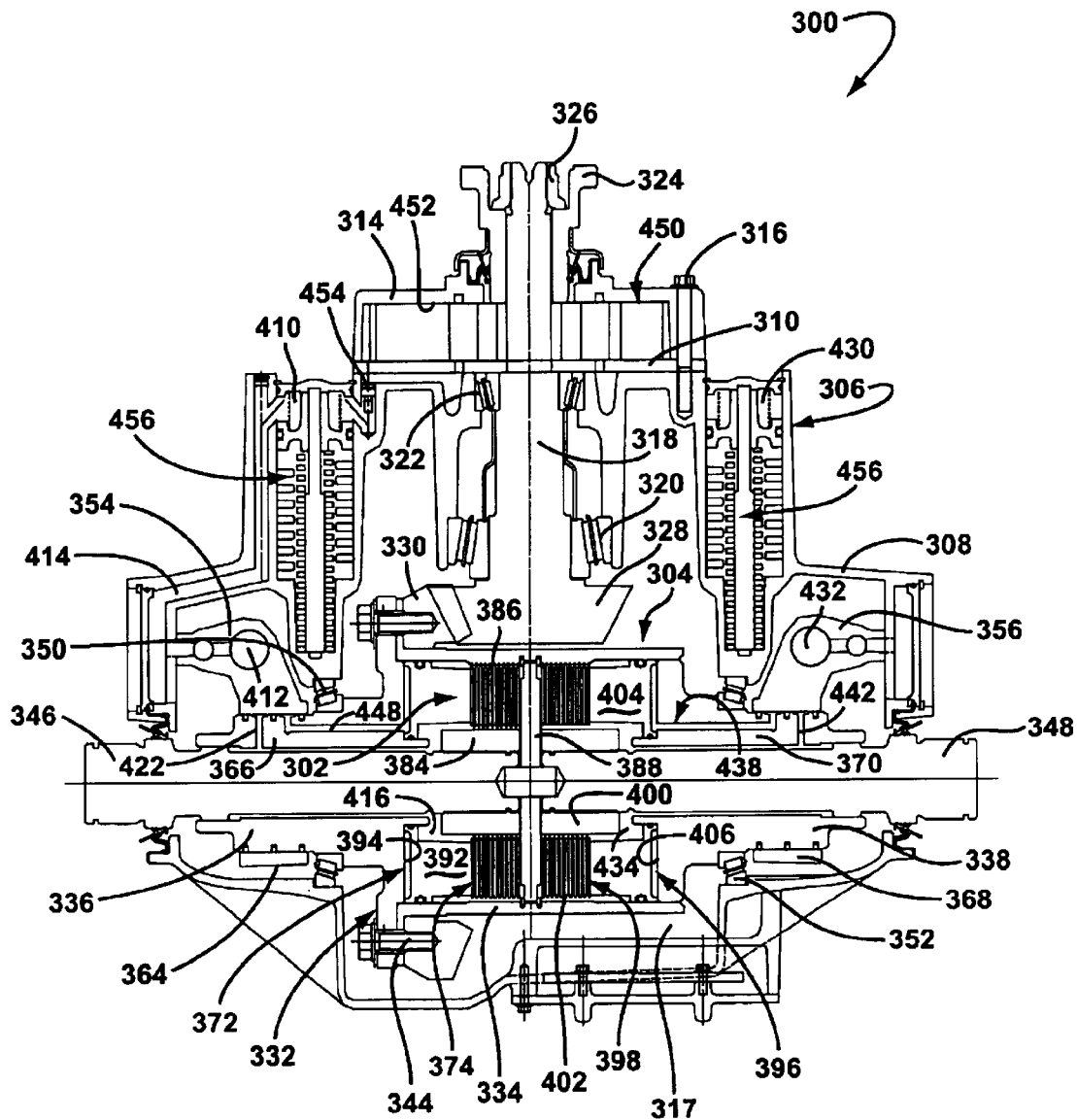
FIG. 9 is a sectional view of a drive axle assembly according to an alternative preferred embodiment of the present invention.

Referring now to FIG. 9, an alternative embodiment of a drive axle assembly is shown and hereinafter identified by reference numeral 300, which can be substituted for drive axle assembly 34 into drivetrain 10 shown in FIG. 1. In general, drive axle assembly 300 is operable to selectively transmit drive torque from propshaft 28 to one or both axleshafts 30 via selective actuation of at least one of a first hydraulic coupling 302 and a second hydraulic coupling 304.

Drive axle assembly 300 includes a multiple-piece axle housing assembly 306 comprised of a drive housing 308, a pump plate 310 and a pump housing 314 secured via bolts 316 to both drive housing 308 and pump plate 310. Axle housing assembly 306 is constructed to define a pump chamber 452, a drive chamber 317 and a pair of accumulator chambers 410 and 430. A pinion shaft 318 is adapted for connection to propshaft 28 and is shown to be rotatably supported from axle housing assembly 306 via head bearing assembly 320 and a tail bearing assembly 322. A flange yoke 324 is splined to pinion shaft 318 and retained thereon via a lock nut 326. Flange yoke 324 is adapted to transmit drive torque from propshaft 28 to pinion shaft 318. Pinion shaft 318 extends through pump chamber 452 of axle housing assembly 306.

As seen, a pinion gear 328 formed on pinion shaft 318 is located in drive chamber 317 of axle housing assembly 306 and is meshed with a crown or ring gear 330 that is secured to a drive case assembly 332. Drive case assembly 332 includes a cylindrical drum 334, a first clutch housing 336 and a second clutch housing 338. Drum 334 includes a radial flange which mates with a radial flange on first clutch housing 336 such that ring gear 330 is secured thereto via bolts 344. A first output shaft 346 is rotatably supported within first clutch housing 336 while a second output shaft 348 is rotatably supported within second clutch housing 338. Output shafts 346 and 348 are adapted for connection to axleshafts 30 for transmitting drive torque to corresponding ones of rear wheels 30. First clutch housing 336 is shown to be rotatably supported by bearing assembly 350 from drive housing 308 while second clutch housing 338 is similarly supported for rotation by a bearing assembly 352. As such, drive case assembly 332 is supported for rotation relative to each of output shafts 346 and 348.

With continued reference to FIG. 9, drive axle assembly 300 is further shown to include a first valvebody 354 and a second valvebody 356, each of which is secured and sealed relative to drive housing 308. As seen, first valvebody 354 has a hub segment 364 surrounding a sleeve segment 366 of first clutch housing 336 while second valvebody 356 has a hub segment 368 surrounding a sleeve segment 370 of second clutch housing 338.

First hydraulic coupling 302 is generally similar to hydraulic coupling 44 in that it includes an actuator assembly 372 and a transfer clutch 374. Transfer clutch 374 is a multi-plate clutch assembly operably disposed between drive case assembly 332 and first output shaft 346. In particular, transfer clutch 374 includes a hub 364 splined for rotation with first output shaft 346 and a clutch pack 386 of interleaved inner and outer clutch plates splined respectively to hub 384 and drum 334. A separator plate 388 is splined at its outer peripheral surface for rotation with drum 334 and is axially restrained via a pair of snap rings. Actuator assembly 372 is operable to exert a clutch engagement force on clutch pack 386 against separator plate 388 for transferring drive torque from drive case assembly 332 to first output shaft 346. Actuator assembly 372 includes a first piston 392 retained for sliding movement relative to clutch pack 386 within a first pressure chamber 394 defined between drum 334 and first clutch housing 336.

Second hydraulic coupling 304 likewise includes an actuator assembly 396 and a transfer clutch 398. Transfer clutch 398 is a multi-plate clutch assembly operably disposed between drive case assembly 332 and second output shaft 348. Specifically, transfer clutch 398 includes a hub 400 splined for rotation with second output shaft 348 and a clutch pack 402 of interleaved inner and outer clutch plates splined respectively to hub 400 and drum 334. Actuator assembly 396 is operable to exert a clutch engagement force on clutch pack 402 against separator plate 388 for transferring drive torque from drive case assembly 332 to second output shaft 348. Actuator assembly 396 includes a second piston 404 retained for sliding movement relative to clutch pack 402 in a second pressure chamber 406 defined between drum 334 and second clutch housing 338.

First clutch housing 336 is formed to include a series of flow passages for permitting the selective supply of fluid from a first accumulator chamber 410 formed in drive housing 308 through a first PWM control valve assembly 416 to first pressure chamber 394 or to a first cooling chamber 412. In particular, an accumulator passage 414 communicates with first accumulator chamber 410 and the inlet of first PWM valve assembly 412. A first supply passage (not shown) formed in first valvebody 354 communicates with a second supply passage 418 formed in first clutch housing 336 which, in turn, communicates with first pressure chamber 394. Likewise, a first exhaust passage (not shown) formed in first valvebody 354 communicates with a second exhaust passage 422 formed in first clutch housing 336 which, in turn, communicates with first cooling chamber 416. Suitable ring seals are shown between first valvebody 354 and first clutch housing 336 to provide a fluid-tight seal between the supply and exhaust flow paths.

As will be detailed, first PWM valve assembly 412 is selectively actuated by control module 68 to regulate the fluid pressure $P_C$ delivered to first pressure chamber 394 and the exhaust pressure $P_E$ delivered to first cooling chamber 416. As previously noted, the amount of drive torque transferred to first output shaft 346 is proportional to the magnitude of the clutch engagement force exerted by first piston 392 on clutch pack 386 which, in turn, is a function of the control pressure $P_C$ delivered to first pressure chamber 394 by PWM control valve assembly 412. Control valve assembly 412 is actuated in response to electric control signals generated by control module 68.

Second clutch housing 338 is formed to include a series of flow passages for permitting selective supply of fluid from a second accumulator chamber 430 formed in axle housing 308 through a second PWM control valve assembly 432 to second pressure chamber 406 or a second cooling chamber 434. Second accumulator chamber 430 is in communication with an inlet of second PWM control valve assembly 432 via an accumulator passage (not shown). A first supply passage (not shown) formed in second valvebody 356 communicates with a second supply passage 438 formed in second clutch housing 338 which, in turn, communicates with second pressure chamber 406. Likewise, a first exhaust passage 440 formed in second valvebody 356 communicates with a second exhaust chamber 442 formed in second clutch housing 338 which, in turn, communicates with second cooling chamber 434. Again, seal rings provide a fluid-tight seal between the exhaust and supply passages. Second PWM control valve assembly 432 can be selectively actuated via electric controls signals from control module 68 to regulate the control pressure $P_C$ delivered to second pressure chamber 406 and the exhaust pressure delivered to second cooling chamber 434. Preferably, accumulator chambers 410 and 430 are in fluid communication to maintain a desired inlet fluid pressure that is delivered to both PWM control valves 412 and 432.

With continued reference to FIG. 9, drive axle assembly 300 is shown to also include a hydraulic pump assembly 450 installed in a pump chamber 452 formed in pump housing 314. Preferably, pump 450 is a vane-type variable displacement pump capable of pumping fluid from sump 100 into both accumulator chambers 410 and 430 in response to rotation of pinion shaft 318. A suitable one-way check valve 454 permits delivery of fluid from the outlet of pump assembly 450 into accumulator chambers 410 and 430. In addition, an accumulator assembly 456 is retained in each of accumulator chambers 410 and 430 for maintaining fluid at a desired inlet pressure to the inlet of each of control valve assemblies 412 and 432.

Figure 6:
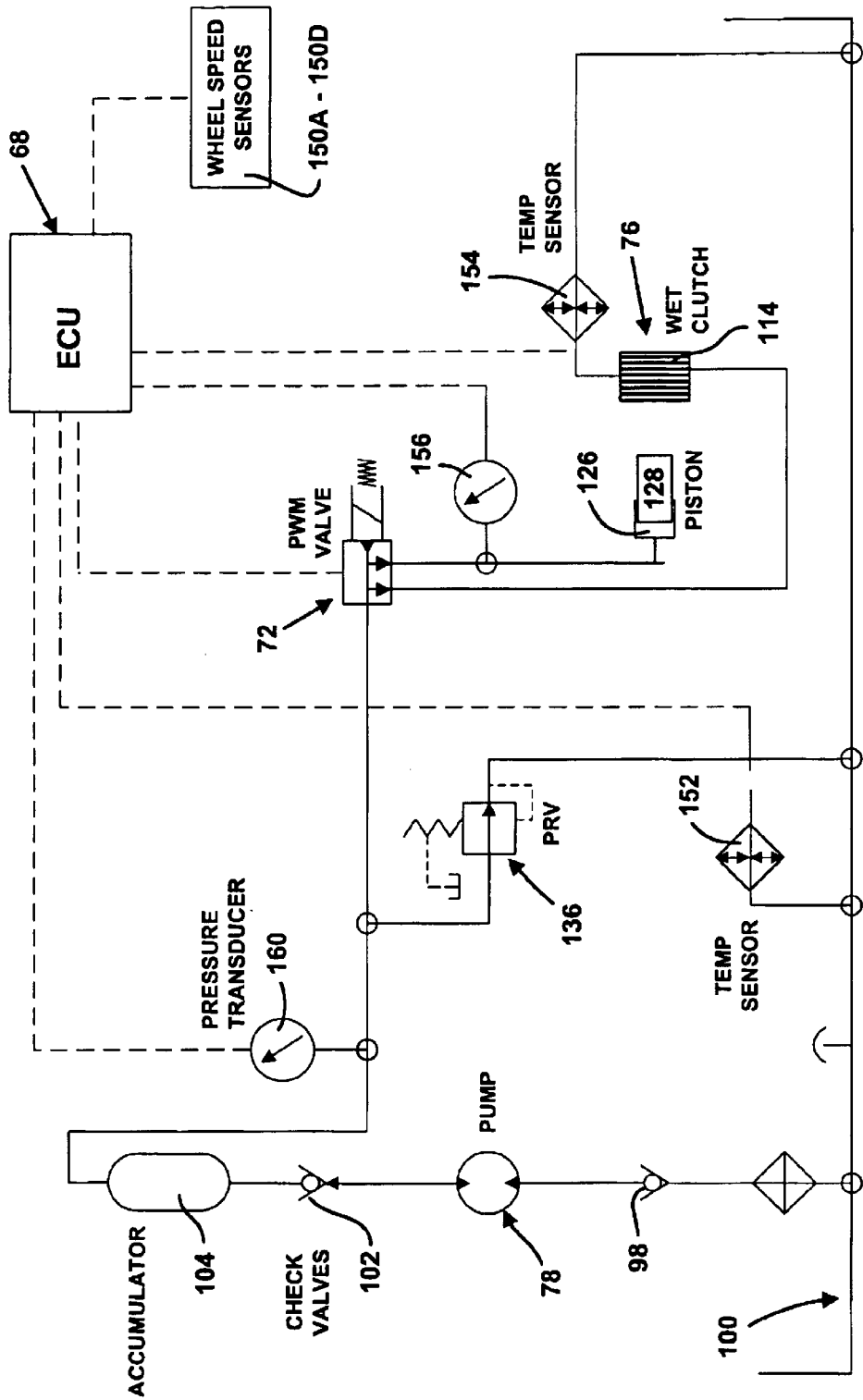
Figure 10:
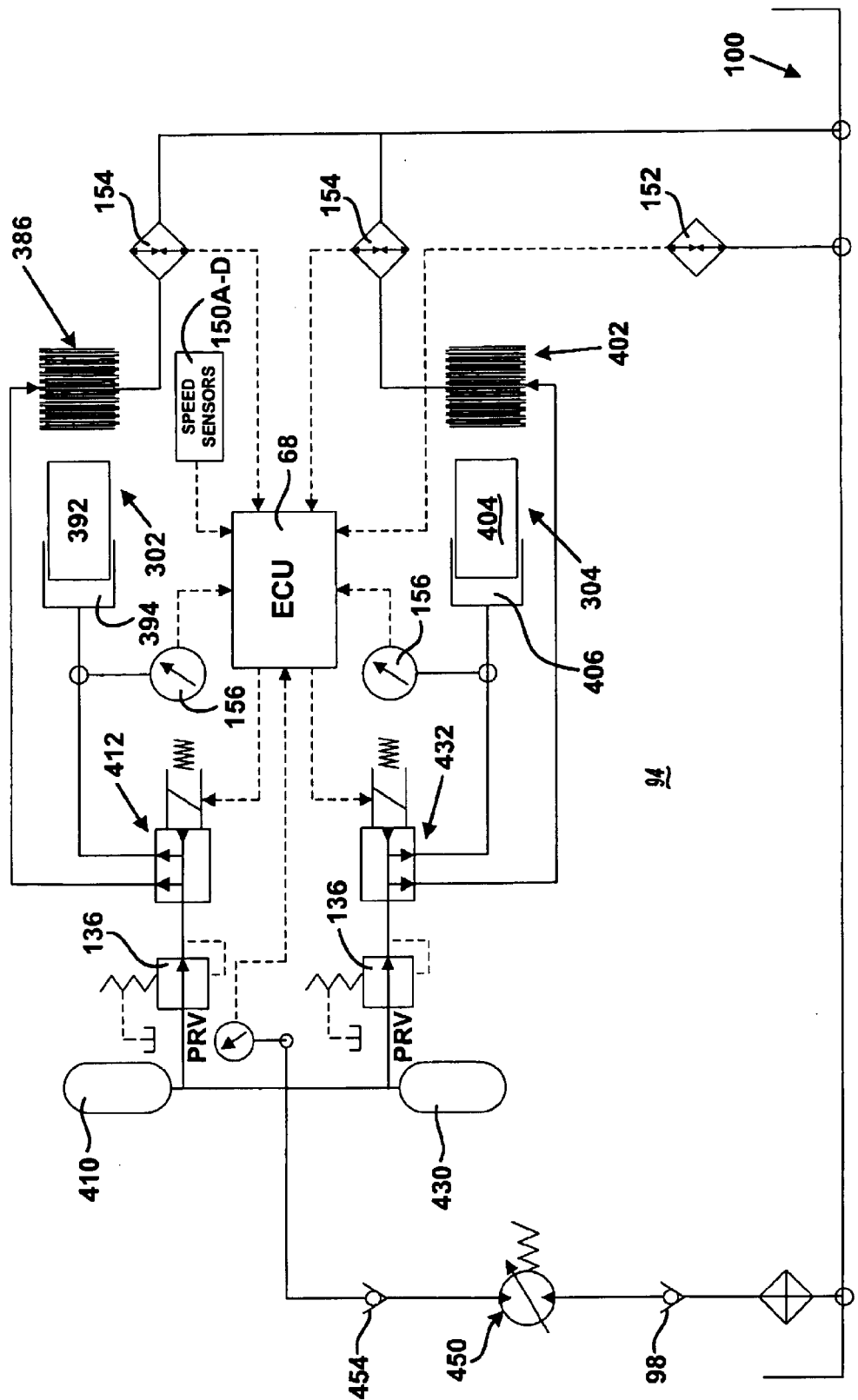
FIG. 10 is a schematic diagram illustrating the hydraulic circuit for the dual-clutch drive axle assembly shown in FIG. 9.

FIG. 10 is a version of the schematic hydraulic diagram shown in FIG. 6 that has been modified to illustrate independent control of hydraulic couplings 302 and 304. Common components and sensors are again shown for use in adaptively controlling actuation of the hydraulic couplings in a manner similar to that described for the single hydraulic coupling arrangement previously described in reference to FIGS. 2 through 8.

Figure 11:
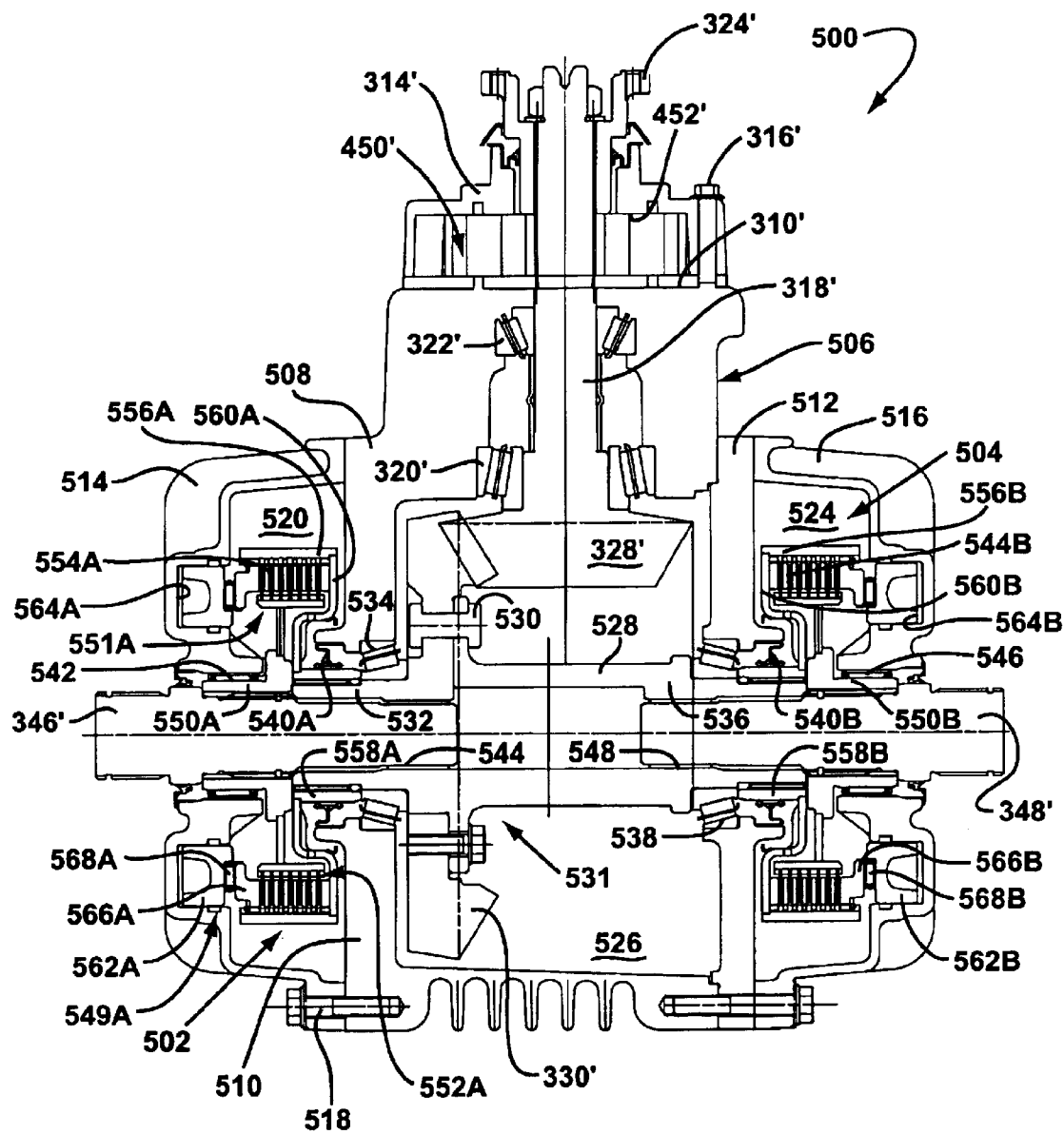
FIGS. 11 and 12 are sectional views of another alternative preferred embodiment of a drive axle assembly according to the present invention.
Figure 12:
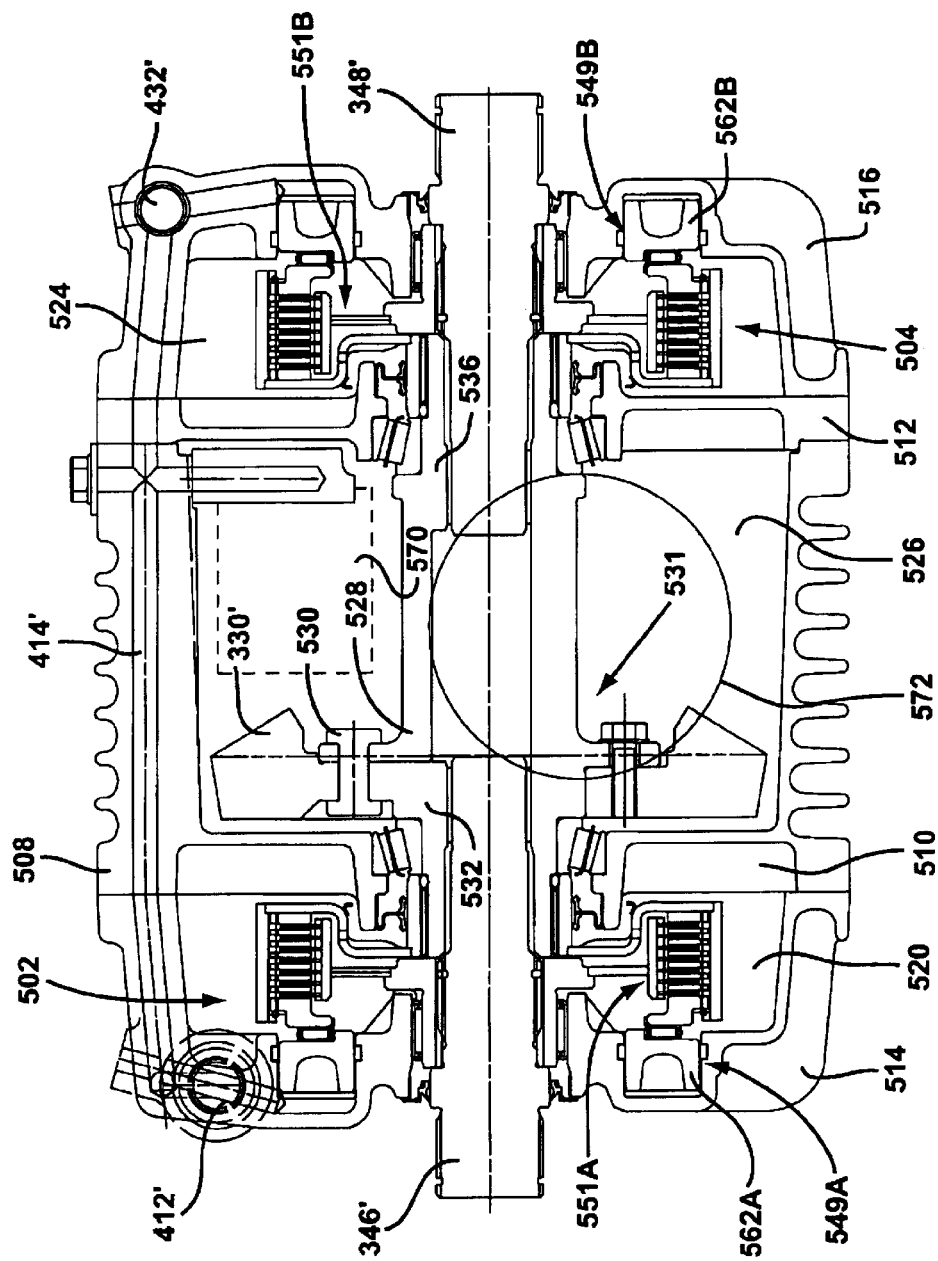

Referring now to FIGS. 11 and 12, an alternative construction for a twin-coupling drive axle assembly is shown and identified by reference numeral 500. Drive axle assembly 500 is generally similar in operation to that of drive axle assembly 300 but is arranged to separate the drive components and clutch components into distinct chambers formed within axle housing assembly 506 to permit use of different types of fluids and accommodate use of identical components for both hydraulic couplings.

Housing assembly 506 includes a gear housing 508 having an integral bearing support plate 510, a separate bearing support plate 512, and first and second clutch housings 514 and 516. As seen, first clutch housing 514 is secured via bolts 518 to integral bearing support plate 510 of gear housing 508 to define a first clutch chamber 520. Second clutch housing 516 is secured via bolts 522 to bearing support plate 512 to define a second clutch chamber 524. Bolts 522 also secure bearing support plate 512 to gear housing 508. The area between bearing support plates 508 and 512 defines a gear chamber 526. A pump plate 310' and a pump housing 314' are secured via bolts 316' to gear housing 508 to enclose gear chamber 526 and define a pump chamber 452'. Fluid pump 450' is disposed within pump chamber 452'. Pinion shaft 318' is adapted for connection to propshaft 28 and is rotatably supported by gear housing 508 via a suitable head bearing assembly 320' and tail bearing assembly 322'. Yoke 324' is splined to shaft 318' and permits connection of propshaft 28 to pinion shaft 318', respectively.

A pinion gear 328' formed on pinion shaft 318' is meshed with a crown or ring gear 330' that is secured to a drive hub 528 via bolts 530. Crown gear 330' and hub 528 together define a drive assembly 531. Ring gear 330' has a tubular sleeve segment 532 rotatably supported by a bearing assembly 534 from integral bearing support plate 508. Likewise, hub 528 has a sleeve segment 536 that is rotatably supported from bearing support plate 512 via a bearing assembly 538. As constructed, bearings 320', 322', 534 and 538 are lubricated by the fluid entrained in gear chamber 526. A pair of rotary seal rings 540A and 540B provide a fluid-tight seal between gear chamber 526 and first and second clutch chambers 520 and 524.

A first output shaft 346' is supported for rotation relative to first clutch housing 514 via a bearing assembly 542 and for rotation relative to drive assembly 351 via a journal bearing 544. Similarly, a second output shaft 348' is supported for rotation relative to second clutch housing 516 via a bearing assembly 546 and for rotation relative to drive assembly 351 via a journal bearing 548. First output shaft 346' is adapted for connection to one of axleshafts 30 while second output shaft 348 is adapted for connection to the other one of axleshafts 30.

Drive axle assembly 500 includes a first actively-controlled hydraulic coupling 502 operably disposed between first output shaft 346' and drive assembly 351 and a second actively-controlled hydraulic coupling 504 operably disposed between second output shaft 348' and drive assembly 351. First coupling 502 and second coupling 504 use identical components such that only those associated with first coupling 502 will be detailed with common reference numerals having "A" and "B" suffixes being used for each corresponding coupling. First coupling 502 includes an actuator assembly 549A and a transfer clutch 551A. Transfer clutch 551A is a multi-plate clutch assembly including a hub 550A splined for rotation with first output shaft 346', a drum assembly 552A splined for rotation with drive assembly 351, and a clutch pack 554A therebetween. Drum assembly 552A includes a cylindrical drum 556A, a coupler hub 558A splined to sleeve segment 532 of ring gear 330', and a connector plate 560A rigidly interconnecting drum 556A to coupler hub 558A. Seal ring 540A is shown to be installed between an annular rim of bearing support plate 508 and coupler ring 558A and located between bearing assembly 534 and connector plate 560A. Actuator assembly 549A includes a piston ring 562A retained for sliding movement in an annular pressure chamber 564A formed in first clutch housing 514, a pressure plate 566A acting on clutch pack 554A, and a thrust bearing 568A therebetween.

Housing assembly 506 defines a series of flow passages to provide a fluid circuit between a sump of a second type of fluid from which hydraulic pump 450' draws and delivers this second fluid at pump pressure to first and second control valves 412' and 432' correspondingly associated with first and second coupling 502 and 504. The second fluid is used to actuate the transfer clutches and cool/lubricate their clutch packs. An accumulator passage 414' is formed to extend through each of the housing sections of housing assembly 506 which is provided with pump pressure $P_G$ generated by pump 450' in response to rotation of pinion shaft 318'. An accumulator assembly 570, shown in phantom in FIG. 12, communicates with passage 414' and includes spring-biased accumulator assemblies (not shown) for maintaining a desired fluid pressure in passage 414'. The relationship of accumulator assembly 570 to pinion gear 328' is shown by circle 572 which indicates the location of pinion gear 328' within gear chamber 526. It is contemplated that the hydraulic circuit shown in FIG. 10 is again applicable for use with drive axle assembly 500.

Comparing drive axle assembly 500 to drive axle assembly 300 it can be seen that the transfer clutches have been moved from the axle ring gear area to an area outside of the axle support bearings. This arrangement permits the clutch packs to be larger in diameter, thus reducing the number of plates and/or the required load. Separation of the clutch cavities allows the use of a conventional hypoid oil as the first fluid within the gear cavity while allowing a lighter fluid (i.e., ATF) to be used for clutch actuation and cooling. The option of using distinct types of fluids thus enhances various functional and packaging characteristics of drive axle assembly 500.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A drive axle assembly for use in a motor vehicle to transfer drive torque from a powertrain to a pair of wheels, comprising:
   a housing defining a pump chamber, a gear chamber, and first and second clutch chambers;
   a pinion shaft adapted to receive drive torque from the powertrain and having a shaft segment extending through said pump chamber and a pinion gear disposed in said gear chamber;
   a drive assembly supported for rotation in said gear chamber and having a ring gear meshed with said pinion gear;
   a first output shaft supported for rotation relative to said housing and said drive assembly and adapted for connection to one of the wheels;
   a second output shaft supported for rotation relative to said housing and said drive assembly and adapted for connection to the other of the wheels;
   a first hydraulic coupling located within said first clutch chamber and including a first transfer clutch operably disposed between said drive assembly and said first output shaft, a first piston for engaging said transfer friction clutch in response to fluid pressure exerted thereon, and a first control valve for controlling the fluid pressure exerted on said first piston;
   a first seal mechanism for providing a fluid-tight seal between said first clutch chamber and said gear chamber;
   a second hydraulic coupling located within said second clutch chamber and including a second transfer clutch operably disposed between said drive assembly and said second output shaft, a second piston for engaging said second transfer clutch in response to fluid pressure exerted thereon, and a second control valve for controlling the fluid pressure exerted on said second piston;
   a second seal mechanism for providing a fluid-tight seal between said second clutch chamber and said gear chamber;
   a pump disposed in said pump chamber and driven by said pinion shaft for supplying pressurized fluid to said first and second control valves; and
   a traction control system including speed sensors for detecting the rotary speed of at least two of said pinion shaft and said first and second output shafts, a first temperature sensor for detecting the fluid temperature in said first clutch chamber, a second temperature sensor for detecting the fluid temperature in said second clutch chamber, and a control unit receiving signals from said speed sensors and said temperature sensors and generating control signals in response thereto, said control signals delivered to said first and second control valves to independently vary the fluid pressure exerted on said first and second pistons.

2. The drive axle assembly of claim 1 wherein said control unit includes logic for controlling actuation of said first control valve in response to predetermined relationships related to speed differences between said pinion shaft and said first output shaft.

3. The drive axle assembly of claim 2 wherein said logic is further operable to control actuation of said second control valve in response to predetermined relationships related to speed differences between said pinion shaft and said second output shaft.

4. The drive axle assembly of claim 1 wherein said logic is further operable to control actuation of said first and second control valves in response to speed differences between said first and second output shafts.

5. The drive axle assembly of claim 1 wherein said logic is further operable to compensate for changes in fluid viscosity based on the fluid temperature detected by a third temperature sensor.

6. The drive axle assembly of claim 1 wherein said control unit is adapted to open said first control valve and vent fluid for releasing engagement of said first transfer clutch when the fluid temperature detected by said first temperature sensor exceeds a predetermined value.

7. The drive axle assembly of claim 1 further comprising an accumulator in fluid communication with an outlet of said pump and an inlet to each of said first and second control valves.

8. The drive axle assembly of claim 1 wherein a first fluid is entrained in said gear chamber and a second fluid is entrained in said first and second clutch chambers and is in fluid communication with said pump.

9. The drive axle assembly of claim 1 wherein said housing includes a gear housing, first and second support plates fixed to said gear housing to define said gear chamber therebetween, a first clutch housing fixed to said first support plate to define said first clutch chamber therebetween, and a second clutch housing fixed to said second support plate to define said second clutch chamber therebetween.

10. The drive axle assembly of claim 1 wherein said housing further includes a pump housing fixed to said gear housing to define said pump chamber therebetween.

* * * * *